Sept. 27, 1966     J. J. BANEWICZ ET AL     3,275,903
ELECTROCHEMICAL COULOMETER AND METHOD
Filed Aug. 3, 1962
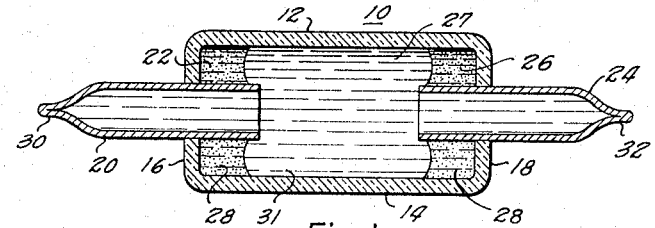
Fig. 1
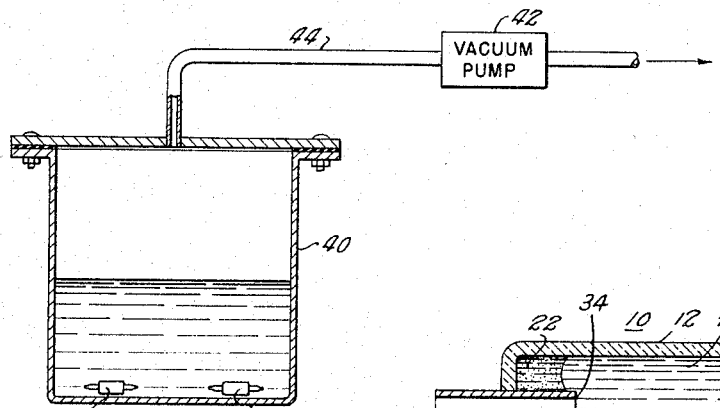
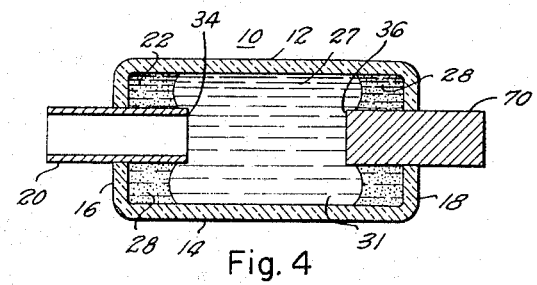
Fig. 4
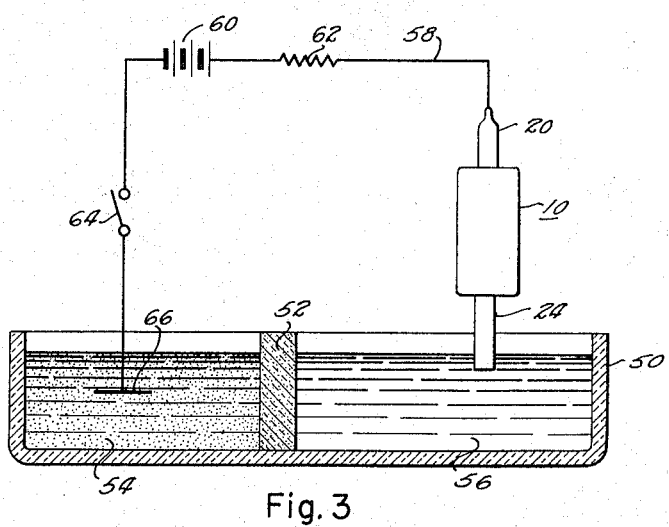
Fig. 3
INVENTORS
Gary R. Argue
John J. Banewicz
Richard F. Stewart
BY *Gilo C Clegg Jr*
ATTORNEY

3,275,903
ELECTROCHEMICAL COULOMETER AND METHOD
John J. Banewicz, Dallas, and Gary R. Argue and Richard F. Stewart, Richardson, Tex., assignors, by mesne assignments, to Self-Organizing Systems, Inc., Dallas, Tex., a corporation of Texas
Filed Aug. 3, 1962, Ser. No. 214,758
14 Claims. (Cl. 317—231)

The present invention relates to electrochemical coulometers and more particularly to an improved mechanical structure for electrochemical coulometers which provides improved electrical and physical characteristics and the method for filling and charging same.

A family of electrochemical devices in which a number of different effects are achieved by the movement of ions in solution has attracted considerable attention in recent years. These devices are known by the acronym "solions." They are discussed in some detail in the literature: "Journal of the Electrochemical Society," volume 104, No. 12 (December 1957); "Yale Scientific Magazine," volume XXXII, No. 5 (February 1958); "Electronics Product Engineering Bulletin No. 1," published November 5, 1957, by National Carbon Company, 30 East 42nd Street, New York 17, New York; and "An Introduction to Solions," published February 1962 by Texas Research and Electronic Corporation, 6612 Denton Drive, Dallas, Texas.

One type of solion device is called a visual readout integrator (VRI), so named because the concentration of the measured species can be determined visually, if the measured species is one that colors the solution such as iodine.

In the earlier coulometers of this type, a cell having two separate electrolyte chambers was provided. An electrode was located in each of the chambers. The two chambers were physically separated, but electrochemically connected, by a diffusion barrier such as a fritted glass disk or a capillary tube. The usual electrolyte employed was an iodine-potassium iodide solution or other ionized solution of a reversible redox system such as ferrocyanide-ferricyanide. When current was passed through the device, iodine was reduced to iodide at the cathode and iodide was oxidized to iodine at the anode. A coulometer was provided as the concentration of the measured species, suitably iodine, changed due to current flow in accordance with Faraday's law.

The accuracy of the above described device was somewhat limited in that diffusion of the measured species occurred from one chamber to the other whether or not current was flowing whenever the concentration of iodine in the two compartments was different.

A substantial advance in the art was made when it was discovered that by separating the two compartments with a conductive liquid that was immiscible with the electrolyte or solution contained in the two compartments, and in which the measured species was substantially less soluble than in the solvent comprising the electrolyte or solution, diffusion of the measured species between the two compartments was virtually eliminated. Such a system is disclosed in United States Patent No. 2,890,414, which issued June 9, 1959, in the name of Earl S. Snavely, Jr.

The invention of Snavely described in the above identified patent made possible a device having many possible applications. However, great commercial use of the device has been hindered by difficulties which have arisen in mass producing units with consistently uniform characteristics.

The present invention provides an improved physical constructure which makes it possible to produce devices having reproducible electrical characteristics in large quantities. In addition, the device provided by the present invention has improved electrical characteristics in that the internal resistance of the smaller device is reduced considerably. The present device is capable of operating at higher voltages than the prior art devices without the reduction of oxygen from entrapped air in an irreversible reaction that will ultimately ruin the device, further extending the usefulness of the device. The mechanical characteristics are also improved in that the sealing operation is simplified, and the devices can better withstand shock, vibration and extremes of temperature.

Briefly, in accordance with the principles of the present invention, two spaced apart compartments are provided, each of the compartments opening into an enclosed area. The desired solution of the measured species in a solvent is contained within each of the two spaced apart compartments, the width of each of the compartments being sufficiently small that movement of the solution contained therein is restricted due to capillary forces. The conductive liquid fills the enclosed area and any portion of the two compartments that does not contain the solution. The conductive liquid thus provides both a diffusion barrier and a conductive path in the manner taught by the Snavely patent. A first electrode is provided which contacts the conductive liquid and the solution contained in one of the compartments. A second electrode is also provided, the second electrode contacting the conductive liquid and the solution contained in the other of the two compartments. At least one opening which communicates with the enclosed area is also provided, the opening providing means for admitting the solution and conductive liquid into the device.

According to the preferred embodiment of the invention, the electrode associated with each of the compartments comprises at least a portion of the compartment, insuring that the solution contacts the electrode over a relatively large surface area. The configuration of each electrode is also preferably such that the conductive liquid also contacts each of the electrodes over a relatively large area. The quantity of solution and conductive liquid used can, therefore, vary to some extent without adversely affecting the resistance of the device, by contradistinction with the prior art devices.

In accordance with one specific example of the invention, the case of the device is of tubular configuration. The electrodes are also of tubular configuration and are positioned at opposite ends of the device, each of the electrodes being axially aligned with the tubular case. The inside diameter of the tubular case is only slightly larger than the outside diameter of the tubular electrodes, such that an annular compartment open at one end is defined by the case and each electrode, the outer surface of each electrode extending within the case defining one wall of a compartment. The amount that each electrode extends into the case is preferably large with respect to the separation between the case and electrode and the separation between the case and each electrode is made small such that the solution is held in position even though the device may be subjected to rather extreme conditions of vibration and shock.

An improved method for providing a device of the type described with the desired solution and conductive fluid is also provided. By utilizing the method and structure provided by the present invention, mass production of solion visual readout integrators is made feasible.

The preferred method of providing the desired solution and conductive fluid comprises the steps of first vacuum filling the device with the solution. Thereafter, the major portion of the solution is removed from the device by suitable means, the narrow dimensions of the spaced apart compartments being such that capillary forces will retain a portion of the solvent in each of the two compartments. The device is then vacuum filled with the desired conductive liquid. The filling operation can be successfully accomplished if only one opening that communicates with the enclosed area is provided. However, best results have been achieved by providing two opposed openings which communicate with the enclosed area.

If the device is initially filled with the solvent and measured species in solution, the capacity of the unit will be determined by the quantity of the solution which remains within the spaced apart compartments and the concentration of the measured species in the solution.

However, as small changes in physical dimensions of the device can cause a rather large change in the number of the measured species present within the devices, the capacity of particular devices will normally vary over a relatively wide range. The present invention also provides a method for providing a desired number of the measured specie within the device. In accordance with the present invention, the device is initially filled only with the solvent rather than the solvent and measured species in solution.

After the device has been filled with the conductive liquid, an electrical connection is provided between the electrode which contacts the solvent in one of the compartments and an electrode which contacts a quantity of the measured species in solution. An electrochemically conductive path is also provided between the solvent contained in the compartment and the solution. Thereafter, a predetermined amount of current is caused to flow for a predetermined amount of time, causing a known number of the measured species to be transferred from the solution to the solvent contained within the compartment of the device in accordance with Faraday's law.

Thus, it is possible to mass produce devices which have uniform characteristics although the physical dimensions of the devices and the amount of solution contained within the devices may vary over a reasonably wide range as the number of the measured species is controlled rather than attempt to control the amount of solution and the concentration of the measured species in the solution.

Many objects and advantages of the invention will become apparent to those skilled in the art as the following detailed description of the same unfolds when taken in conjunction with the appended drawings wherein like referenced numerals denote like parts and in which:

FIGURE 1 is a cross sectional view illustrating one preferred embodiment of the device structure provided by the present invention;

FIGURE 2 diagrammatically illustrates the preferred apparatus for use in filling the device provided by the present invention with the desired solvent and conductive liquid;

FIGURE 3 diagrammatically illustrates the preferred method and apparatus to be utilized in adding the desired amount of the species to be measured to the solvent in one of the compartments; and FIGURE 4 is a view in cross section illustrating a second preferred embodiment of the device structure provided by the prestnt invention.

Turning now to FIGURE 1 of the drawings, the electrochemical coulometer provided according to one preferred embodiment of the present invention is denoted generally by the reference numeral 10. It is seen to include an encasing structure 12 which suitably includes a tubular body portion 14 and sealed end portions 16 and 18. A first electrode 20 also preferably of a tubular configuration is also provided. The electrode 20 extends through the end portion 16 in axial alignment with the tubular body portion 14. An annular compartment which is open at one end is defined by the tube 20, the end portion 16 and a portion of the tubular body portion 14. The length of the compartment 22 is equal to the distance that the terminal 20 protrudes into the area enclosed by the encasing structure 12 and the width of the compartment 22 is defined by the difference between the outside diameter of the electrode 20 and the inside diameter of the tubular body portion 14. In similar fashion, a second tubular electrode 24 which extends through the end portion 18 in axial alignment with the electrode 20 and the tubular body portion 12 is also provided. A second annular compartment 26 that is open at one end is defined by the electrode 24, the end portion 18 and the tubular body portion 12. Thus, two spaced apart compartments which open into the enclosed area 27 are defined.

The compartments 22 and 26 each contain a solution 28 which suitably comprises iodine and a solvent in which the iodine has a high degree of solubility such as normal pentanol. The enclosed area 27 and the portion of the compartments 22 and 26 not filled with the solution 28 are filled with a conductive liquid 31 in which the measured species has a solubility substantially lower than its solubility in the solvent. A preferred conductive liquid is a solution containing 2 normal lithium iodide and 2½ normal lithium nitrate. The tubular electrodes 20 and 24 may be sealed at points 30 and 32 respectively by pinching the electrodes 20 and 24 to form a compression seal, or other suitable sealing means may be utilized.

The width of the chambers 22 and 26 is sufficiently small that movement of the solution 28 within the chambers 22 and 26 is restricted by capillary forces. If the width of the chambers 22 and 26 is made very small, the mass of the solution 28 contained therein will also be very small, and the restriction of movement will be quite severe, allowing the device 10 to be subjected to rather extreme conditions of vibration and shock without displacing the solution 28 or producing an inter-mingling of the solution 28 and the conductive solution 31.

The dimensions of the compartments 22 and 26 can vary over relatively wide ranges depending upon the viscosity of the particular solvent used, the magnitude of the capillary forces present and the amount of shock and vibration which the unit must withstand. However, as the width of the compartments 22 and 26 is increased, the stability of the solution within the compartments will decrease accordingly.

It is seen that the solution 28 contained within the compartment 22 contacts the electrode 20 over a relatively wide surface area. In similar fashion, the solution 28 contained within the compartment 26 contacts the electrode 24 over a relatively wide surface area. The conductive liquid 31 contacts each of the electrodes 20 and 24 over a relatively wide area making possible a unit which has a very low internal resistance. For some reason which is not fully understood, it has been discovered that the electrical resistance of the device is reduced considerably if the solution 28 completely fills the compartments 22 and 26 such that the ends 34 and 36 of the electrodes 20 and 24 respectively do not project into the conductive liquid 31 a short distance as shown. Thus, the amount of solution 28 provided in the compartments 22 and 26 can vary somewhat without adversely affecting the resistance of the device 10.

According to one specific example of the structure shown in FIGURE 1, the encasing structure 12 was formed of soft glass tube having an inside diameter of 0.030". The distance between the end portion 16 and the end potrion 18 was 0.60". The electrodes 20 and 22 were each formed of platinum tubing having a wall thickness of 0.005", the inside diameter of the tubing being 0.010" and the outside diameter of the tubing being 0.020". The electrodes 20 and 22 each protruded into the encasing structure 12 approximately 0.10". The annular compartments 24 and 26 defined at opposite ends of the device 12 thus had a length of approximately 0.10" and a width of approximately 0.005".

The preferred method for providing the device 10 with the solution 28 and the conductive liquid 31 will now be described with reference to FIGURE 2 of the drawings. As shown, a vacuum tank 40 which is adapted for evacuation by vacuum pump 42 through line 44 is provided. The devices 10 which were to be filled were placed within the tank and a sufficient amount of the solvent which comprises the major constituent of the solution 28 was placed in the tank 40 to cover the devices 10. The vacuum pump 42 was actuated, creating a partial vacuum within the tank 40. The amount of vacuum which can be achieved depends upon the vapor pressure of the particular solvent used. According to one specific example of the invention wherein normal pentanol was used as the solvent, a vacuum of approximately 10 millimeters of mercury was achieved. When the vacuum was released, the units 10 were filled with the solvent contained in the tank 40.

As a result of the vacuum filling cycle, the units 10 were completely filled with the solvent. A quantity of the solvent was then removed from the device 10 by placing a blotter to one of the open electrodes 20 or 24 and withdrawing the solvent from the device 10 by capillary action. Alternatively, the solvent may be removed from the device 10 by creating an air bubble in one of the tubular electrodes 20 and 24, sealing that particular electrode and utilizing vacuum means attached to the opposite electrode for withdrawing the solvent from the device 10. Although the main portion of the solvent 10 is removed from the interior of the device 10, the narrow width of the compartments 22 and 26 in conjunction with the capillary forces present will cause a small amount of the solvent to remain in position within the compartments 22 and 26 and not be removed even though the device is subjected to rather high vacuum, except by vaporization.

A quantity of the desired conductive liquid 31 was then placed in the vacuum tank 40 and the units 10 were immersed in the conductive solution. The vacuum pump 42 was again actuated, producing a vacuum as described above. The vacuum was released, filling the remaining empty portion of the device 10 with the conductive liquid 31. If the inside diameter of the tubular electrodes 20 and 24 is sufficiently small, capillary action will maintain the conductive liquid within the device 10. Otherwise, it is desirable to seal device 10 prior to the time that the devices 10 are removed from the vacuum tank in order that a minimum amount of air be entrapped within the device.

If desired, the compartments 22 and 26 may be filled initially with a solution containing a desired concentration of the measured specie. The capacity of the resulting device will be determined by the quantity of the solution that is contained within the compartments 22 and 26. However, if the device is one whose dimensions are very small, as is usually desired, the amount of solution contained within the compartments 22 and 26 of the device 10 will be very small and very small changes in the dimensions of the electrodes 20 and 24 and the encasing structure 12 will produce wide variations in the total quantity of measured specie contained within the device 10. However, if the capacity of the device 10 is not critical, the compartments 22 and 26 can suitably be filled initially with the solution 28 rather than the solvent.

The preferred manner of charging the device 10 with the measured specie to obtain devices having uniform electrical characteristics will now be described with reference to FIGURE 3. As shown in FIGURE 3, a tank 50 which may be of glass or other suitable non-conductive material is provided. The tank 50 include a diffusion barrier 52, which may be of fritted glass, that physically separates the tank 50 into a first compartment 54 and a second compartment 56. The compartment 56 contains a conductive liquid, suitably the same as the conductive liquid 31 which fills the enclosed area of the device 10. The compartment 54 contains a rather high concentration of the measured species in solution. Thus, physical mixing of the measured species and the conductive liquid contained within the tank 50 is prevented by the diffusion barrier 52, but electrochemical conduction is allowed.

The terminal 20 of the device 10 is sealed and electrically connected through lead 58 to a constant current source, which may suitably be a battery 60 and a high resistance resistor 62. The other side of the battery 60 is connected through switch 64 to an electrode 66 which is immersed within the solution 28 contained in the compartment 54. The unsealed tubular electrode 24 is inserted into the conductive liquid contained within the compartment 56.

Thus, an electrical connection is provided between the electrode 20 which contacts the solvent contained within the compartment 22 and the electrode 66 which contacts the solution contained in the compartment 54, the electrode 20 being the anode and the electrode 66 being the cathode. An electrochemically conductive path is also provided through the diffusion barrier 52 and the conductive liquid contained within the device 10 and the compartment 56 between the solvent contained within the compartment 22 and the measured species contained within the compartment 54.

When the switch 64 is closed, a constant amount of current will flow in the circuit connected to the electrode 20, causing iodine to be reduced to iodide at terminal 66, the cathode, and causing iodide to be oxidized to iodine at the anode, terminal 20. The measured specie, iodine, is thus transferred from the compartment 54 of the tank 50 to the compartment 22 of device 10 in accordance with Faraday's law. By controlling the level of current flow at a predetermined constant value and allowing current to flow for a predetermined time, a predetermined number of the measured specie are transferred from the tank 50 to the device 10. The devices 10 will thus have a predetermined capacity and devices having uniform characteristics can be consistently produced although the physical dimensions of the devices may vary.

According to one specific embodiment of the invention, the voltage provided by the battery 60 was 35 volts and the resistance of the resistor 62 was 5.5 megohms. After the switch 64 was closed 106 minutes, the capacity of the device 10 was 40,100 microcoulombs. The capacity of such a device is customarily given in terms of electrical charge as this is the quantity of electrical charge required to convert the measured species to the other species of the redox system in accordance with Faraday's law. Thus, in accordance with the preferred example of the invention wherein iodine is the measured species and iodide is the other species of the reversible redox system, the capacity of the unit in microcoulombs would be the quantity of electrical charge required to reduce the iodine in one compartment to iodide and oxidize sufficient iodide to produce an equal amount of iodine in the second compartment in accordance with Faraday's law.

FIGURE 4 illustrates a second preferred embodiment of the device provided by the present invention. As can be seen by reference to the drawing, the device 10 shown in FIGURE 4 is very similar to the device 10 shown in FIGURE 1, the only difference being that the terminal 70 which extends through the sealed end portion 18 is of platinum rod rather than being of platinum tube as was the terminal 24 of FIGURE 1.

The principal advantage of the structure shown in FIGURE 4 over the structure in FIGURE 1 is that the small diameter tubing of the type utilized in many of the smaller devices is extremely expensive. Also, one less sealing operation is necessary, minimizing the possibility of leakage of the unit.

Alternatively, both of the electrodes associated with the device 10 could be of rod material rather than tubing and a tube which communicates with the enclosed area 27 could be provided. However, it is generally easier to seal a platinum tube rather than an opening in the glass and the tubular electrode 20 appears to provide the more convenient structure for providing the necessary opening which communicates with the enclosed area 27.

If only one opening which provides communication with the enclosed area 27 is provided, vacuum means must usually be employed for removing the solvent or solution from the device 10. Even though vacuum means are employed, it is necessary that an air bubble be created within the device 10 before the solvent or solution can conveniently be removed. In accordance with the principles of the present invention, a potential of approximately 1 volt is supplied between electrodes 70 and 20. Hydrogen is evolved from the solvent at a voltage of approximately 0.9 volt in an irreversible reaction, creating a bubble at the electrode 70. Once the bubble is created at the electrode 70, the desired amount of solvent can successfully be removed from the device 10 by subjecting it to a suitable vacuum. Thereafter, the filling of the device 10 can proceed in the manner described above.

Thus, an improved device is provided by the present invention which possesses improved electrical and mechanical characteristics over the prior art devices. The cross sectional area of the conductive liquid is made large with respect the cross sectional area of the solution, decreasing the resistance of the device. Also, if the electrodes are utilized to form the compartments, it is possible for both the solution and the conductive liquid to contact the electrodes over a relatively large surface area further reducing the resistance of the device. By providing compartments of narrow width, a small amount of the solution is spread over a relatively wide area providing improved visibility for the use of the same constant amount of solution. The annular configuration specifically disclosed herein is especially desirable from this standpoint. As the configuration of the compartments which contain the solution is such that a desired quantity of the solution will remain in the compartments even when the device is subjected to the vacuum, it is possible to utilize vacuum filling for all portions of the assembly of the device, making it feasible to produce the device in large quantities. In addition, as the devices are vacuum filled, the amount of oxygen or other gasses which remain in the device after the sealing operation is minimized, allowing the device to be operated at higher voltages. By electrically charging the device with the measured specie, devices having consistently uniform electrical characteristics may be obtained without the necessity for maintaining extremely close tolerances in the physical size of the various compartments and the meticulous filling required in the prior art devices. Thus, not only are the electrical characteristics of the device improved but the cost of such devices is reduced considerably.

Although the invention has been described with regard to certain preferred embodiments, many changes and modifications will be obvious to those skilled in the art. The invention is, therefore, to be limited not to what has been specifically described herein but only as necessitated by the scope of the appended claims.

What we claim is:

1. An electrochemical coulometer of the type that functions by electrolytic transfer of a measured species in a reversible redox system that comprises two spaced apart compartments, each of said compartments opening into an enclosed area, each of said two spaced apart compartments containing a solution of the measured species in a solvent, the width of each of said compartments being sufficiently small that the solution contained therein is retained in said compartments by capillary forces, a conductive liquid immiscible with said solvent filling said enclosed area and any portion of said two compartments that does not contain said solution, the solubility of said species being substantially less in said conductive liquid than in said solvent whereby said conductive liquid provides both a diffusion barrier and a conductive path between said compartments, a first electrode contacting said conductive liquid and the solution contained in one of said compartments, a second electrode contacting said conductive liquid and the solution contained in the other of said compartments, and at least one sealable opening for communicating with said enclosed area.

2. An electrochemical coulometer of the type that functions by electrolytic transfer of at least one chemical species in a reversible redox system that comprises an encasing element having a first electrode projecting into the enclosed area, a first compartment defined by a portion of the encasing structure and the projecting portion of said first electrode, a second electrode projecting into the enclosed area in a spaced apart relationship to said first electrode, a second compartment defined by a portion of the encasing structure and the projecting portion of said second electrode, each of said compartments containing a solution of said species in a solvent, the width of each of said first and second compartments being sufficiently small that the solution is retained in said compartments by capillary forces, and between the compartments a liquid immiscible with said solution and in which measured species has a solubility substantially less than its solubility in said solution, said liquid providing an electrolytically conducting path between said compartments.

3. An electrochemical coulometer as defined in claim 2 wherein the space between each of said electrodes and the encasing structure is less than the length of the electrode projecting into said enclosed area.

4. An electrochemical coulometer as defined in claim 2 wherein at least one of said electrodes comprises a hollow tube.

5. An electrochemical coulometer as defined in claim 2 wherein said first electrode and said second electrode each comprise a hollow tube.

6. An electrochemical coulometer as defined in claim 4 wherein said encasing structure is of tubular configuration.

7. An electrochemical coulometer as defined in claim 6 wherein the length of said encasing element is greater than the diameter of said encasing element.

8. An electrochemical coulometer as defined in claim 7 wherein said electrodes are of platinum and said encasing element is of soft glass.

9. The method of making an electrochemical coulometer having two compartments which are sufficiently narrow to restrict movement of the fluid contained therein that comprises filling the coulometer case with a solvent in which the measured species is soluble; removing the solvent from the coulometer case until a substantial amount of solvent remains only in the compartments; filling the remaining portion of the coulometer case with a conductive liquid that is immiscible with said solvent and in which the solubility of the measured species is substantially less than its solubility in said solvent; electrochemically connecting said conductive liquid to a quantity of the said species; and electrically connecting an electrode in contact with the solvent in one of said compartments to said quantity of measured species, and causing current to flow to transfer a measured quantity of said measured species to the solvent in said one of said compartments.

10. The method of manufacturing an electrochemical coulometer having two spaced apart compartments each containing a solvent in which the species to be measured is soluble, a pair of electrodes, each of the electrodes contacting the solvent in one of the compartments, and a conductive path electrochemically connecting the two compartments, that comprises providing a quantity of said solvent in each of said compartments, electrochemically connecting said conductive path to a quantity of the species to be measured in solution, electrically connecting one of the electrodes contacting the solvent in one of the compartments to said quantity of the species to be measured in solution, and causing current to flow between said one of the electrodes and said quantity of the species to be measured to transfer a predetermined amount of the species to be measured to the compartment containing the solvent in contact with said one electrode.

11. The method of filling an electrochemical device having two spaced apart compartments opening into an enclosed area and an opening for communicating with said enclosed area, each of said compartments being of relatively narrow width whereby the liquid placed in each of said spaced apart compartments is retained therein by capillary forces that comprises vacuum filling said device with a first liquid; removing said first liquid from said device until said first liquid remains only in said two spaced apart compartments; and vacuum filling the remaining empty portion of said device with a second liquid that is immiscible with said first liquid.

12. The method of filling a device of the type described that comprises filling the enclosed area with a solvent for the species to be measured, removing solvent from said enclosed area until said solvent only remains in said first compartment and said second compartment, filling said enclosed area with a conductive liquid immiscible with said solvent in which the measured species has a solubility substantially less than its solubility in said solvent, and providing a desired quantity of said species in the solvent contained in at least one of said compartments.

13. The method of providing a desired number of a measured species in an electrochemical device that comprises placing a solvent for said species in the device in contact with a first electrode, electrically connecting said first electrode to a second electrode in contact with a solution containing said measured species, providing an electrochemical conductive path from said solvent to said solution, and allowing sufficient current to flow to transfer a desired number of said measured species from said solution to said solvent.

14. An electrochemical coulometer of the type that functions by electrolytic transfer of a measured species in a reversible redox system that comprises a tubular case, a first tubular electrode positioned along the axis of said tubular case and extending into one end of said tubular case in sealing relationship with said case to define a first annular compartment open at one end, a second tubular electrode positioned along the axis of said tubular case and extending into the opposite end of said tubular case in sealing relationship with said case to define a second annular compartment open at one end, said first annular compartment being spaced apart from said second annular compartment along the axis of said case, each of said first and second annular compartments containing a solution of the measured species in a solvent, the width of each of said annular compartments being sufficiently small that the solution is retained in said annular compartments by capillary forces, a conductive liquid immiscible with said solution filling the remainder of said tubular case including any portion of said annular compartments not filled with said solution, the solubility of said species being substantially less in said conductive liquid than in said solvent whereby said conductive liquid provides both a diffusion barrier and a conductive path between the solution in said first annular compartment and the solution in said second annular compartment.

References Cited by the Examiner

UNITED STATES PATENTS 2,890,414    6/1959    Snavely _____ 317—231

JOHN W. HUCKERT, *Primary Examiner.*

DAVID J. GALVIN, *Examiner.*

J. A. ATKINS, *Assistant Examiner.*